F. W. WESTERFIELD.
Hand Seeder.
No. 61,783.
Patented Feb. 5, 1867.
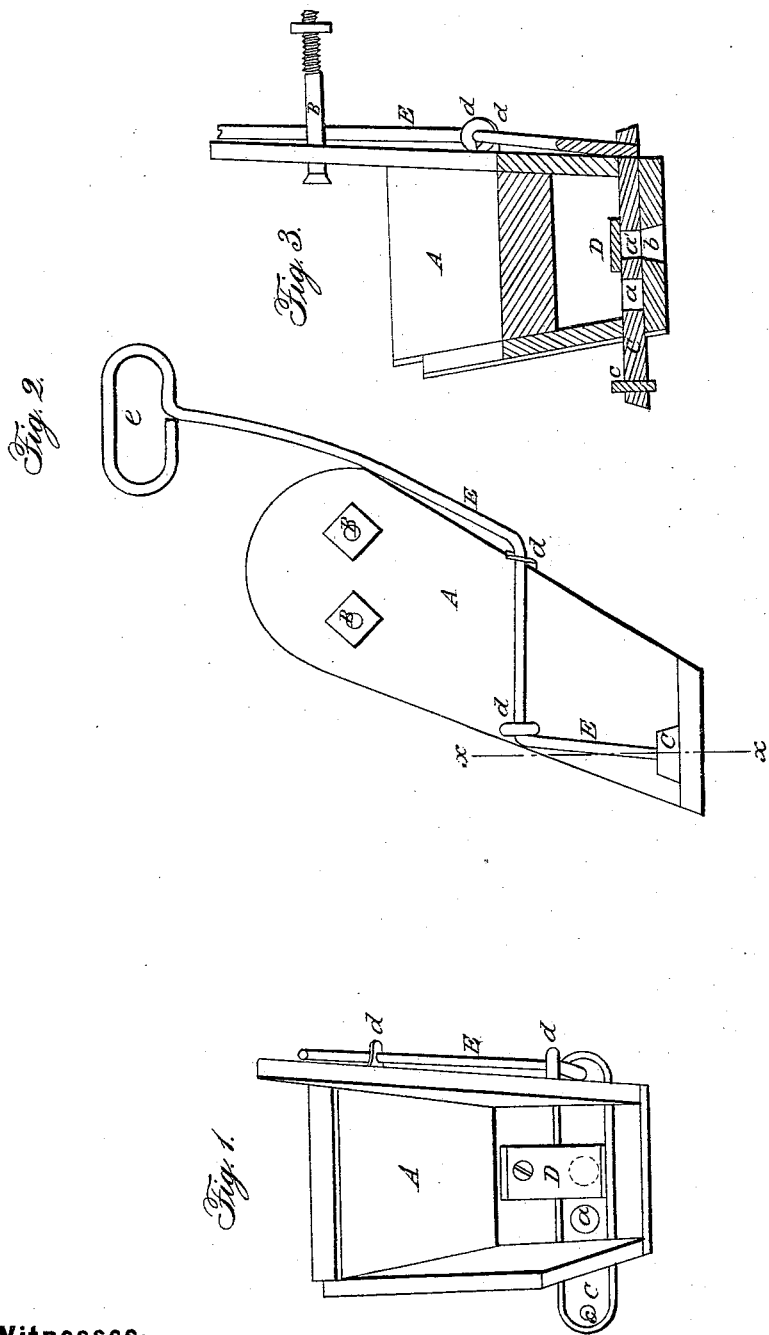
Witnesses:
H. Wickham How
R. H. Seaton
Inventor:
Finley F. Westerfield
By How & Weston
Attys

United States Patent Office.

FINLEY F. WESTERFIELD, OF FORT DODGE, IOWA, ASSIGNOR TO HIMSELF AND C. WESTERFIELD, OF SAME PLACE.

Letters Patent No. 61,783, dated February 5, 1867.

IMPROVEMENT IN CORN PLANTER.

The Schedule referred to in these Letters Patent and making part of the same.

Specification of certain new and useful improvements in Corn Planters invented by FINLEY F. WESTERFIELD, of Fort Dodge, in the county of Webster, and State of Iowa.

My invention consists of a corn planter so constructed as to be capable of being combined in operation with a double-shovel plough; the hopper of the said corn planter being attached to the beam of the said plough, and the whole being arranged and operated substantially as herein above set forth. In the accompanying drawings—

Figure 1 is a top view of my improved corn planter.
Figure 2 is a side elevation of the same, showing the left side of the planter.
Figure 3 is a vertical cross-section, showing the parts to the right of the line $x\ x$, fig. 2.

A is the hopper of the corn planter, and B B are two bolts for bolting it to the beam of the plough; C is a slide having two holes $a\ a^1$ in it, and working under a block or brush, D. Under this block D is a hole, $b$, through the bottom of the hopper A. The slide C passes through both sides of the hopper A, and at one end has a pin, $c$, in it, which prevents it from being drawn too far to the left. At the opposite end the bent lever E is attached to it for the purpose of giving to it a reciprocating motion laterally across the bottom of the hopper A. This motion, which is communicated to the slide C by the driver operating the lever E, is bent at two points, and that portion of it between the two bends is horizontal and supported on or in bearings $d\ d$, thus acting as a rock-shaft, from which project as arms the upper and lower portions of the bent lever E. The upper portion is formed into a handle, $e$, and the end of the lower portion works loosely in a hole in the slide C. A sliding or folding cover may be fitted to the top of the hopper A. The corn planter, constructed as above described, is bolted to the beam of a double-shovel plough between the shovels, so that the forward shovel shall prepare the ground and make a furrow for the corn, the corn planter deposit it at suitable distances apart in the hills, and in sufficient quantities, and the rear shovel cover it. By performing these operations in this way the corn is always deposited in moist earth, the planter does not pack the earth, but leaves it light and loose, and the exact quantity required is accurately deposited, so that it is easy to cultivate it both lengthwise and crosswise of the rows. The planter may also be attached to a sod plough to drop sod corn, or it may be used in a timbered country among stumps.

Having thus fully described my invention, I claim—

The combination of a corn planter constructed as hereinabove set forth, and operated by means of the bent lever E, with a double-shovel plough, or sod plough, substantially as described.

FINLEY F. WESTERFIELD.

Witnesses:
JOHN D. STROW,
JAS. R. STROW.